US008672610B2

(12) United States Patent
Berger et al.

(10) Patent No.: US 8,672,610 B2
(45) Date of Patent: Mar. 18, 2014

(54) UNIT ASSEMBLY SYSTEM FOR AN EXHAUST-GAS TURBOCHARGER

(75) Inventors: Thomas Berger, Ditzingen (DE); Andreas Wengert, Auenwald (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 1150 days.

(21) Appl. No.: 12/622,735

(22) Filed: Nov. 20, 2009

(65) Prior Publication Data
US 2010/0129212 A1    May 27, 2010

(30) Foreign Application Priority Data
Nov. 22, 2008   (DE) .......................... 10 2008 058 618

(51) Int. Cl.
F04D 29/041    (2006.01)

(52) U.S. Cl.
USPC ............................ 415/104; 415/229; 416/174

(58) Field of Classification Search
USPC ........................ 415/104–107, 229; 416/174; 384/303–308, 420, 424–427
See application file for complete search history.

(56) References Cited

U.S. PATENT DOCUMENTS

| | | | |
|---|---|---|---|
| 4,118,079 A | 10/1978 | Newman et al. | |
| 4,309,144 A * | 1/1982 | Eggmann et al. | 415/105 |
| 5,102,305 A | 4/1992 | Bescoby et al. | |
| 6,418,722 B1 * | 7/2002 | Arnold | 60/605.1 |
| 6,669,372 B1 * | 12/2003 | Martin | 384/303 |
| 2006/0018578 A1 | 1/2006 | Krauss et al. | |

FOREIGN PATENT DOCUMENTS

| | | |
|---|---|---|
| DE | 2725572 | 4/1983 |
| EP | 1619356 | 1/2006 |
| WO | WO-99/07982 | 2/1999 |

* cited by examiner

Primary Examiner — Edward Look
Assistant Examiner — Jesse Prager
(74) Attorney, Agent, or Firm — Rader, Fishman & Grauer PLLC

(57) ABSTRACT

The invention relates to a unit assembly system for the manufacture of exhaust-gas turbochargers (1) for internal combustion engines, of motor vehicles in particular, wherein the respective exhaust-gas turbocharger (1) has at least one hydrodynamic axial plain bearing (6) for supporting axial forces of a turbine wheel and/or of a compressor wheel (5) on a housing (7), said axial plain bearing having with regard to an axis of rotation (3) of a shaft (2) supporting the turbine wheel and/or the compressor wheel (5) a plurality of wedge-shaped bearing segments (9) distributed in the circumferential direction, which bearing segments work together with at least one level, annular thrust surface (10, 11) that extends transversely to the axis of rotation (3).

Figure 1:
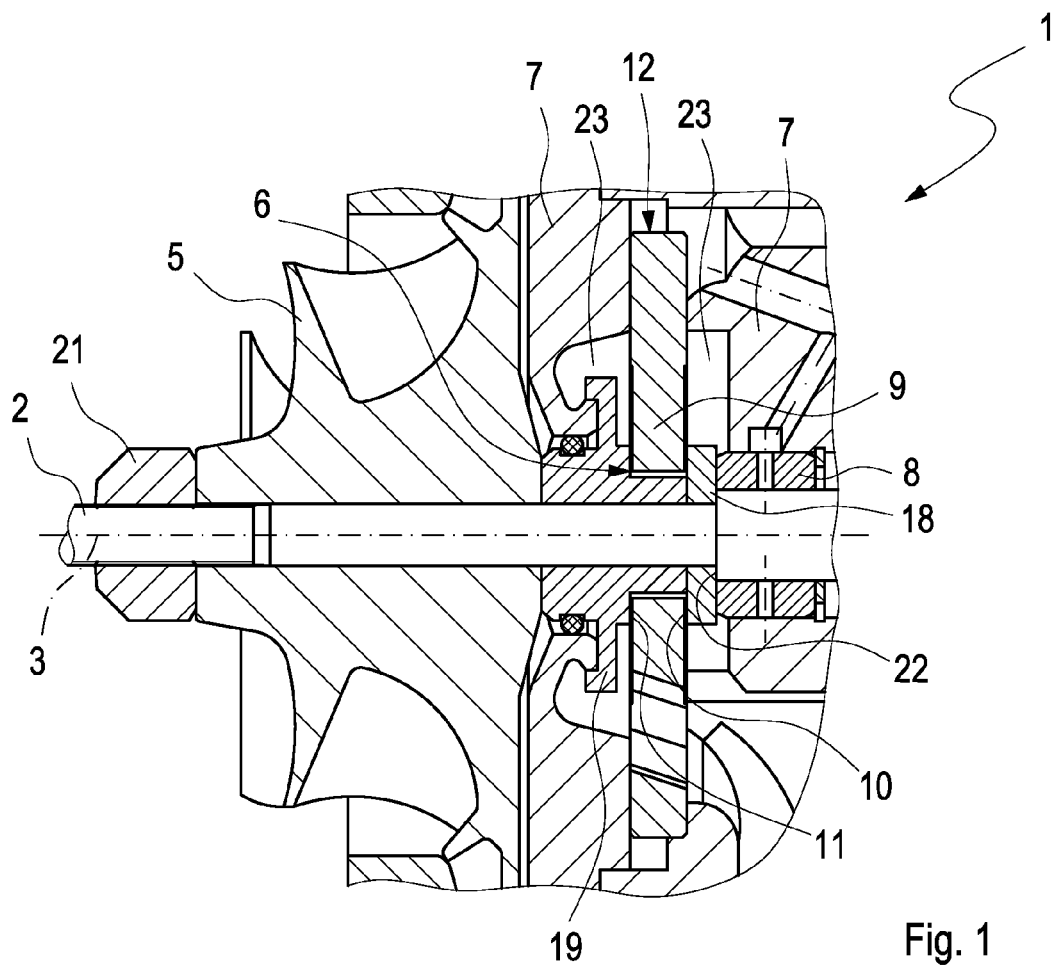

In order to be able to realize in as economical a manner as possible different exhaust-gas turbocharger types that differ from one another by differing loads of the at least one axial bearing (6), the unit assembly system comprises different thrust elements (18, 19) having the respective thrust surface (10, 11), which thrust elements differ from one another by having thrust surfaces (10, 11) of different sizes.

19 Claims, 3 Drawing Sheets

UNIT ASSEMBLY SYSTEM FOR AN EXHAUST-GAS TURBOCHARGER

The present invention relates to a unit assembly system for the manufacture of exhaust-gas turbochargers for internal combustion engines, of motor vehicles in particular. The invention furthermore relates to a method for manufacturing such exhaust-gas turbochargers as well as to an exhaust-gas turbocharger.

An exhaust-gas turbocharger conventionally has at least one hydrodynamic axial plain bearing by means of which axial forces of a turbine wheel and/or of a compressor wheel can be supported on a housing of the exhaust-gas turbocharger. With regard to an axis of rotation of a shaft supporting the turbine wheel or the compressor wheel, this axial plain bearing has only a plurality of wedge-shaped bearing segments distributed in the circumferential direction, which bearing segments work together with at least one level, annular thrust surface that extends transversely to the axis of rotation. The bearing segments and the thrust surface are located in a lubricating oil bath. During the operation of the exhaust-gas turbocharger, the rotation motion between the wedge-shaped bearing segments and the respective thrust surface leads to the formation of a lubricating film that makes a hydrodynamic plain bearing possible.

Such axial plain bearings are, for example, disclosed in document EP 1 619 356 A1 as well as in document WO 99/07982 A1.

Different internal combustion engines can be equipped with varying exhaust-gas turbocharger types that are adapted to the respective internal combustion engine. In particular, in differing internal combustion engines, the loads of the at least one axial bearing can turn out differently. For example, different exhaust-gas turbochargers work at different rotational speeds. Additionally or alternatively, vastly different axial forces can result on the axial bearings within different exhaust-gas turbochargers.

In order to now be able to manufacture with as little outlay as possible exhaust-gas turbochargers that differ from one another at least by differing loads of the at least one axial bearing, it is theoretically possible to provide the differing exhaust-gas turbocharger types with differently optimised axial plain bearings with regard to the respective loads, while the exhaust-gas turbocharger incidentally remains nearly unchanged. The different axial bearings can differ from one another in terms of a different number of the wedge-shaped bearing segments and/or in terms of a different size of the wedge-shaped bearing segments. Nevertheless, the manufacture of the components, which have the wedge-shaped bearing segments, is comparable in terms of outlay.

The present invention addresses the problem of presenting for the manufacture of different exhaust-gas turbochargers, which differ from one another at least by differing loads of the at least one axial bearing, an advantageous way characterised, in particular, by reduced production costs.

This problem is solved according to the invention by the subject matter of the independent claims. Advantageous embodiments are the subject matter of the dependent claims.

The invention is based on the general concept of providing for different exhaust-gas turbocharger types differing thrust elements that have the respective thrust surfaces that exhibit different sizes for the adjustment of the respective axial bearings to the differing loads. In contrast to the wedge-shaped bearing segments, the level and annular thrust surfaces have a structure that is geometrically very simple, thereby making it possible for the thrust elements equipped therewith to be realised in a particularly economical manner. In this manner, the thrust elements having thrust surfaces of different sizes can be manufactured and installed in a particularly simple and economical manner. The costs for the formation of variants can be significantly reduced therethrough. In particular, the components equipped with the wedge-shaped bearing segments can always be configured in the same structural manner by means of which they can be mass-produced and thus manufactured in a more cost-effective manner. All in all, a considerable cost reduction can therefore be realised.

The different thrust elements can, for example, at least in the region of the thrust surface, differ from one another by having different diameters. In the simplest case, the thrust elements are annular bodies or annular discs that can be manufactured with different diameters in a particularly cost-effective manner.

The respective thrust element preferably forms the rotor within the respective axial plain bearings, while the wedge-shaped bearing segments preferably form the stator or are configured on the stator. In theory, however, the converse configuration is also possible.

Additional important features and advantages of the invention can be found in the dependent claims, in the drawings, and in the pertinent description of the figures with reference to the drawings.

It is understood that the features described above and those to be described in what follows can be used not only in the particular cited combination, but also in other combinations or independently without departing from the scope of the present invention.

Preferred embodiments of the invention are shown in the drawings and are described in more detail in the following description, the same reference numerals referring to components which are the same or functionally the same or similar.

It is respectively shown schematically in

Figure 2:
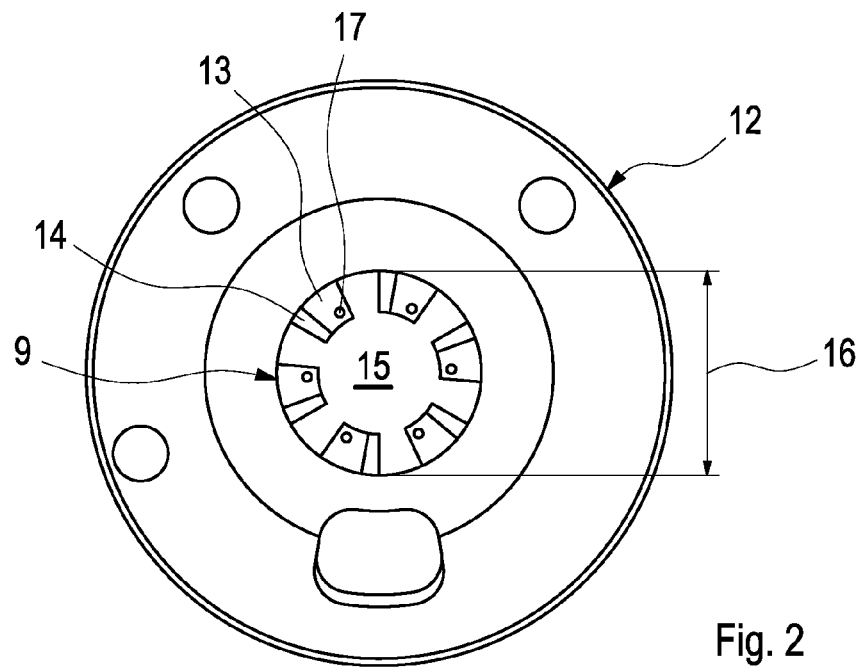
Figure 3:
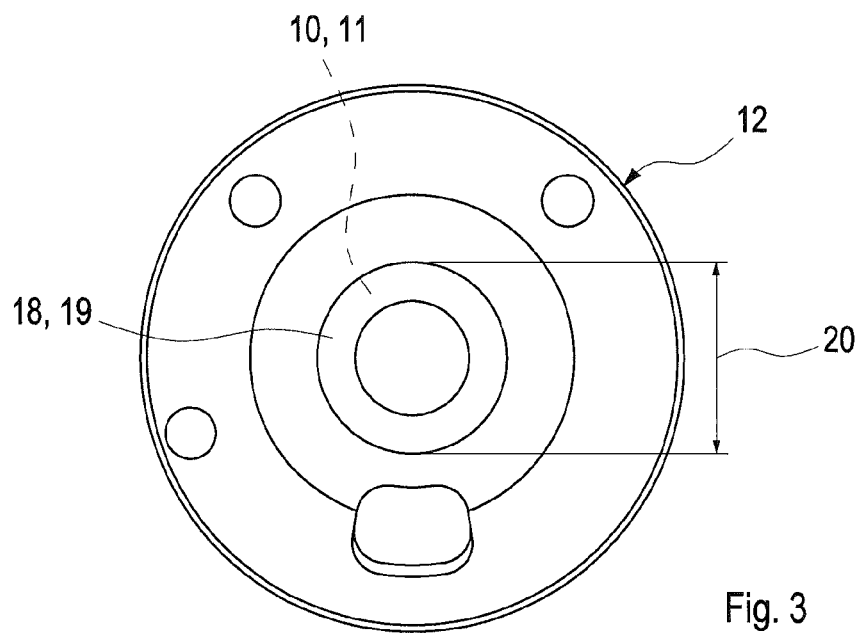
Figure 4:
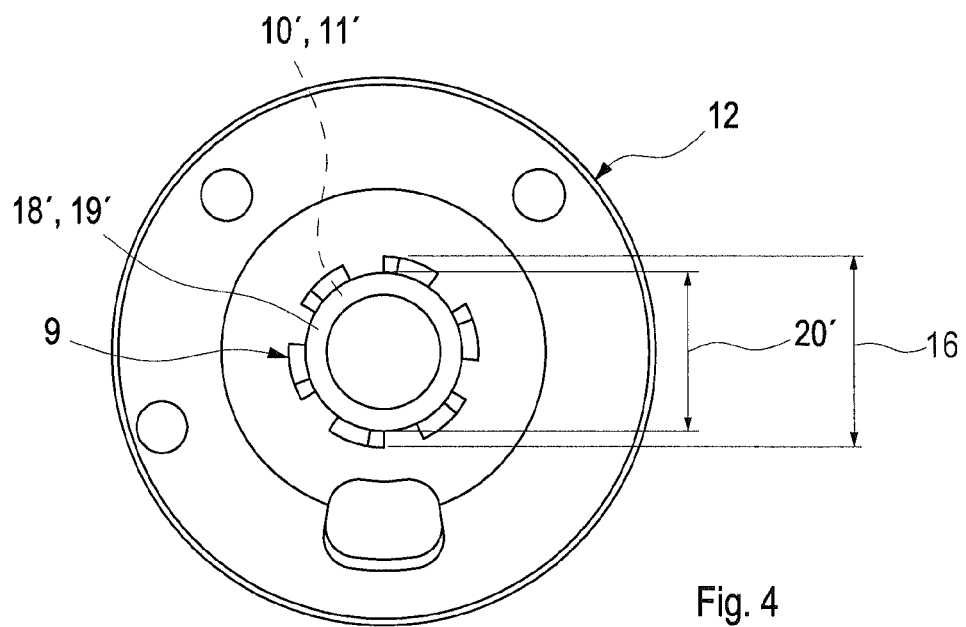
Figure 5:
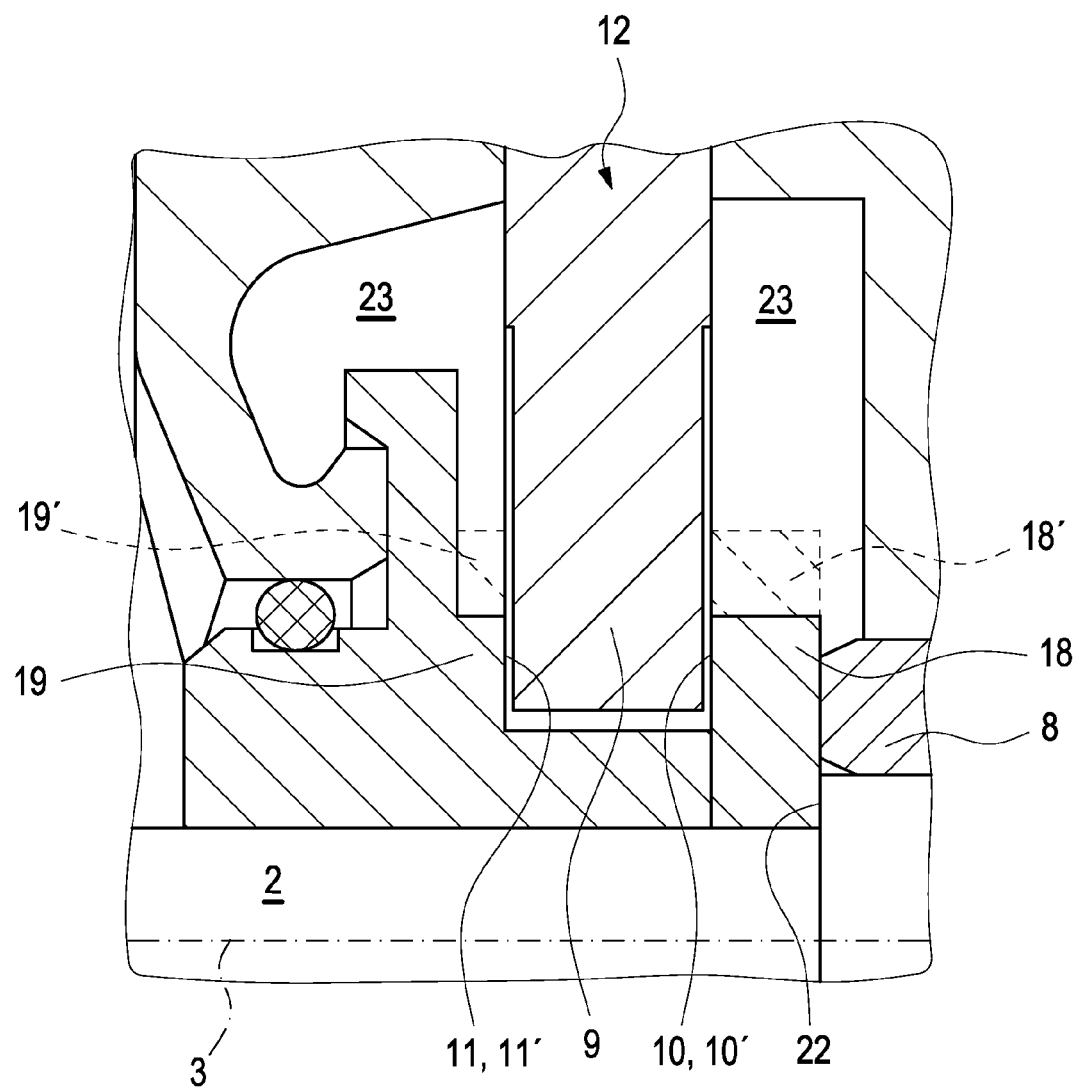

FIG. 1 a very simplified longitudinal section through an exhaust-gas turbocharger in the region of a central axial bearing, FIG. 2 an axial view of a bearing body having a bearing segment, FIG. 3 a view as in FIG. 2, wherein additionally a thrust element is represented that entirely covers the bearing segments FIG. 4 a view as in FIG. 3, however with a thrust element that only partially covers the bearing segments, FIG. 5 an enlarged representation of the axial bearing in the longitudinal section, wherein differing variants are shown at the same time.

Corresponding to FIG. 1, an only partially shown exhaust-gas turbocharger 1 comprises a central shaft 2 that during operation rotates about an axis of rotation 3. The shaft 2 bears in a rotationally-fixed manner a turbine wheel, which is not shown here, and/or a compressor wheel 5. In the shown, preferred example, the exhaust-gas turbocharger 1 has a common shaft 2 for the compressor wheel 5 and for the turbine wheel. In order for the shaft 2 to be able to rotate about its axis of rotation 3, it is rotatably mounted in a housing 7 of the turbocharger 1 by means of at least one radial bearing 8. The respective radial bearing 8 can be configured as a hydrodynamic axial plain bearing. Furthermore, the shaft 2 is supported on the housing 7 in an axial direction by means of a central axial bearing 6. In this manner, axial forces, which during operation act on the turbine wheel and/or on the compressor wheel 5, can be supported by means of the shaft 2 on the housing 7. The axial bearing 6 or the axial plain bearing 6 has with regard to the axis of rotation 3 wedge-shaped bearing segments 9 arranged distributed in the circumferential direction. Moreover, the axial bearing 6 has at least one thrust surface 10, 11 that extends annularly in a plane that is perpendicular to the axis of rotation 3. In the shown, preferred example, such a thrust surface 10 or 11 is respectively provided on both sides of the wedge-shaped segments 9 or wedge segments 9. The wedge segments 9 act with the respective thrust surface 10, 11 to form the hydrodynamic plain bearing and thereby realise a low-friction support of axial forces. In the representations of the thrust elements 18, 19 in FIGS. 3 and 4, respectively only the thrust surface 10, 11 is shown or its covering with the wedge segments 9.

FIG. 2 shows a bearing body 12 in an axial view, on which bearing body the wedge segments 9 are configured. In the example, precisely six wedge segments 9 are provided uniformly distributed in the circumferential direction, said wedge segments having on each axial side a ramp-shaped wedge surface 13 and a preferably level support surface 14. The wedge segments 9 comprise a central through opening 15 that is dimensioned in such a manner that the shaft 2 as well as optionally a component connected thereto in a rotationally fixed manner can be axially inserted into the through opening 15 with radial clearance. The wedge segments 9 extend outward in the radial direction up to a bearing diameter 16. The wedge segments 9 can exhibit in their respective wedge surface 13 a respective outlet opening 17 for lubricating oil by means of which outlet opening the lubricating oil can reach the region between wedge surface 13 and thrust surface 10 or 11.

The respective thrust surface 10 or 11 is respectively configured on a thrust element 18 or 19. The respective thrust element 18 or 19 has on one of the sides opposite the bearing body 9 the respective thrust surface 10 or 11 and is correspondingly likewise configured as an annular body. Corresponding to FIGS. 3 to 5, differently sized thrust surfaces 10, 11 or 10', 11' can be used in the realisation of different exhaust-gas turbocharger types that, as largely structurally similar, are intended to be used or are used in different internal combustion engines such as, for example, the Otto engine and the diesel engine. This is achieved in that the respective thrust element 18, 19 has diameters of different sizes at least in the region of the respective thrust surface 10, 11. In the example of FIGS. 3 to 5, the thrust elements 18, 19 have in the region of the respective thrust surface 10, 11 external diameters 20 or 20' of different sizes. Differently-sized coverings of the wedge segments 9 also result from the thrust surfaces 10, 11 having different sizes. In the variant shown in FIG. 3, a maximal or complete coverage of the wedge segment 9 results. In this instance, the external diameter 20 of the thrust surface 10, 11 or of the thrust element 18, 19 in the region of the thrust surface 10, 11 corresponds substantially to the diameter 16 that the wedge segments 9 exhibit radially on the outside. In contrast thereto, in the embodiment shown in FIG. 4, the outer diameter 20' of the thrust surface 10', 11' or of the thrust element 18', 19' is significantly smaller in the region of the respective thrust surface 10', 11' than the diameter 16 of the external circuit of the wedge segments 9. Accordingly, the respective smaller thrust surface 10', 11' in FIG. 4 only partially overlaps or covers the wedge segments 9. In the example, the axial bearing 6 is thus configured as an axial bearing that is axially operative on both sides in such a manner that it can support both compressive forces of the turbine wheel as well as compressive forces of the compressor wheel 5 on the housing 7.

The bearing body 12 is preferably arranged in a rotationally-fixed manner on the housing 7, while the thrust elements 18, 19 are arranged on the shaft 2 in a rotationally-fixed manner. Accordingly, the external diameter 20 preferably varies in the thrust surfaces 10, 11, while the interior diameter 20 can substantially remain the same. In so far as the oil supply occurs by means of the through openings 17, which are integrated in the wedge segments 9, these through openings 17 are positioned as far radially inward as possible in such a manner that even with the use of the smallest thrust surface 10, 11, the lubricating oil enters in the gap between the wedge segments 9 and the thrust surface 10, 11.

In the example shown, the thrust element 18, which is associated with the turbine wheel that is not shown, is configured as an annular thrust disc 18 that is connected in a rotationally-fixed manner to the shaft 2 in a suitable manner. In contrast thereto, the thrust element 19 in the example, which thrust element is associated with the compressor wheel 5, is configured as an annular piston ring carrier 19. This is likewise connected in a suitable manner to the shaft 2 in a rotationally-fixed manner. In the example, the thrust disc 18, the piston ring carrier 19, and the compressor wheel 5 are bolted by means of a nut 21 against a collar 22 of the shaft 2, thereby being axially tensioned and thus connected to the shaft 2 in a rotationally fixed manner in this way.

It can be seen in FIG. 5 how different overlaps or coverings can be realised between the wedge segments 9 on the one hand and between the thrust surfaces 10, 11 on the other, in that thrust elements 18, 19 are used with thrust surfaces 10, 11 of different sizes. By means of the thrust surfaces 10, 11 of different sizes, the load capacity of the axial bearing 6 can be changed, by means of which the axial bearing 6 can be adapted to different cases of operation and thus to different exhaust-gas turbocharger types. For example, the load of the axial bearing 6 is a function of the axial forces that arise during operation, which axial forces must be supported by means of the axial bearing 6 on the housing 7.

Moreover, the axial bearing 6 works hydrodynamically in such a manner that the load of the axial bearing 6 is also a function of the rotational speed of the shaft 2.

In a unit assembly system for the manufacture of exhaust-gas turbochargers 1, which can exhibit different loads of the axial bearing 6, different thrust elements 18, 19 can be provided that differ from one another by their thrust surfaces 10, 11 that have different sizes. By installing these differing thrust elements 18, 19, the respective exhaust-gas turbocharger type can be adapted to the respective load of the axial bearing 6.

While in a conventional exhaust-gas turbocharger 1, the matching of wedge segments 9 and thrust surfaces 10, 11 preferably takes place in such a manner that the thrust surfaces 10, 11 completely cover the wedge segments 9 in the radial direction, a turbocharger 1 can also be realised by means of the unit assembly system proposed here or by means of the method realisable therewith, in which turbocharger the thrust surfaces 10, 11 corresponding to FIG. 4 do not completely cover the wedge segments 9. In such an exhaust-gas turbocharger type, the respective thrust surface 10, 11 is, with regard to its external diameter 20, thus smaller than an operative external diameter 16 of the bearing segments 9. Alternatively, an embodiment is also conceivable in which an interior diameter of the respective thrust surface 10, 11 is larger than an operative interior diameter of the bearing segments 9.

Corresponding to FIGS. 1 and 5, the housing 7 has for the housing of the respective thrust element 18, 19 an installation space 23 that is dimensioned in such a manner that bearing segments 18, 19 having different sizes can be housed or installed. Thus, an exhaust-gas turbocharger type in particular is conceivable in which the respective thrust element 18, 19 does not completely cover the wedge segments 9; however, in which the installation space 23 is sufficiently large enough for a thrust element 18, 19 to also be installed that completely covers the wedge segments 9.

The invention claimed is:

1. A unit assembly system comprising:
   at least one exhaust gas turbocharger hydrodynamic axial plain bearing for supporting axial forces of at least one of a turbine wheel and a compressor wheel on a housing, said axial plain bearing having an axis of rotation of a shaft supporting at least one of the turbine wheel and the compressor wheel; and
   a plurality of wedge-shaped bearing segments all attached to one bearing body and distributed in a circumferential direction, wherein the bearing segments work together with at least one level, annular thrust surface extending transversely to the axis of rotation, wherein the unit assembly system includes different exhaust-gas turbocharger types, wherein the types differ from one another by at least differing loads of the at least one axial bearing, wherein different thrust elements having the respective thrust surface, and wherein at least one thrust element differs from another by having thrust surfaces of different radial sizes that all fit into an installation space that extends radially beyond the thrust elements that differ from one another;
   wherein respective thrust surfaces are configured on respective thrust elements to define an external diameter that is smaller than an operative external diameter of the bearing segments.

2. The unit assembly system as specified in claim 1, wherein the different thrust elements differ from one another by differing diameters at least in the region of the thrust surface.

3. The unit assembly system as specified in claim 1, wherein the thrust elements are arranged in a rotationally-fixed manner on the shaft and as a first element attached to the shaft and as a second element, separate from the first element, attached to the shaft.

4. The unit assembly system as specified in claim 1, wherein at least one thrust element is configured as an annular thrust disc that is arranged on the shaft in a rotatably-fixed manner.

5. The unit assembly system as specified in claim 1, wherein at least one thrust element is configured as an annular piston ring carrier that is arranged on the shaft in a rotatably-fixed manner.

6. The unit assembly system as specified in claim 1, wherein the axial bearing is configured as an axial plain bearing that is axially operative at least on one side.

7. A method for manufacturing exhaust-gas turbochargers for internal combustion engines, in particular for motor vehicles, comprising the steps of:
   supporting axial forces of at least one of the turbine wheel and a compressor wheel on a housing with at least one hydrodynamic axial plain bearing, wherein said axial plain bearing includes an axis of rotation of a shaft, a plurality of wedge-shaped bearing segments distributed in the circumferential direction and about the entire circumference, wherein the bearing segments extend inwardly into an aperture formed in part by thrust elements and in part by a housing, wherein the bearing segments work together with at least one level, annular thrust surface that extends transversely to the axis of rotation; and
   manufacturing different exhaust-gas turbocharger types that differ from one another at least by differing loads of the at least one axial bearing, wherein the thrust elements having different respective thrust surfaces are used, wherein the thrust elements differ from one another by having thrust surfaces of different radial sizes, each radial size of which is positionable within the aperture as defined by the housing;
   wherein respective thrust surfaces are configured on respective thrust elements to define an external diameter that is smaller than an operative external diameter of the bearing segments.

8. An exhaust-gas turbocharger comprising:
   at least one hydrodynamic axial plain bearing for supporting axial forces of at least one of a turbine wheel and a compressor wheel on a housing, said axial plain bearing having an axis of rotation of a shaft for supporting the turbine wheel and/or the compressor wheel, wherein said axial plain bearing includes a bearing body positioned within an installation space of a housing, wherein the installation space is formed in part by two thrust elements; and
   a plurality of wedge-shaped bearing segments all attached to the bearing body, positioned within the installation space, and distributed in a circumferential direction, wherein the bearing segments work together with level, annular thrust surfaces of the two thrust elements that extend transversely to an axis of rotation, wherein the respective thrust surfaces at least partially cover the bearing segments;
   wherein the installation space is dimensioned such that a radial clearance is provided radially beyond a radial end of each of the two thrust elements; and
   wherein respective thrust surfaces are configured on respective thrust elements to define an external diameter that is smaller than an operative external diameter of the bearing segments.

9. The exhaust-gas turbocharger as specified in claim 8, the installation space configured in the housing for housing at least one of the two thrust elements and surfaces of the two thrust elements completely cover the bearing segments.

10. The exhaust-gas turbocharger as specified in claim 8, wherein the two thrust elements are arranged on the shaft in a rotationally-fixed manner and the two thrust elements are separable from one another.

11. The exhaust-gas turbocharger as specified in claim 8, wherein at least one thrust element is configured as an annular thrust disc that is arranged on the shaft in a rotationally-fixed manner.

12. The exhaust-gas turbocharger as specified in claim 8, wherein at least one thrust element is configured as an annular piston ring carrier that is arranged on the shaft in a rotationally-fixed manner.

13. The exhaust-gas turbocharger as specified in claim 8, wherein the axial bearing is configured as an axial plain bearing that is axially operative on at least one side.

14. The unit assembly system as specified in claim 2, wherein the thrust elements are arranged in a rotationally-fixed manner on the shaft, and the two thrust elements are separable from one another.

15. The unit assembly system as specified in claim 2, wherein at least one thrust element is configured as an annular thrust disc that is arranged on the shaft in a rotatably-fixed manner.

16. The unit assembly system as specified in claim 2, wherein at least one thrust element is configured as an annular piston ring carrier that is arranged on the shaft in a rotatably-fixed manner.

17. The unit assembly system as specified in claim 2, wherein the axial bearing is configured as an axial plain bearing that is axially operative at least on one side.

18. The unit assembly system as specified in claim 3, wherein at least one thrust element is configured as an annular thrust disc that is arranged on the shaft in a rotatably-fixed manner.

19. The unit assembly as specified in claim 1, wherein the installation space is defined by:
- the plurality of wedge-shaped bearing segments;
- a housing on both radial sides of the one bearing body; and
- the thrust elements.

* * * * *